United States Patent [19]

Gnadig et al.

[11] Patent Number: 4,544,341
[45] Date of Patent: Oct. 1, 1985

[54] WORKPIECE HAVING WEAR-RESISTANT INSERTS LOCKED IN RECESSES IN THE WORKPIECE

[75] Inventors: Gerhard Gnadig, Ditzingen; Siegfried Kuklinski, Stuttgart, both of Fed. Rep. of Germany

[73] Assignee: Werner & Pfleiderer, Stuttgart, Fed. Rep. of Germany

[21] Appl. No.: 639,912

[22] Filed: Aug. 10, 1984

[30] Foreign Application Priority Data

Aug. 20, 1983 [DE] Fed. Rep. of Germany ....... 3330137

[51] Int. Cl.$^4$ ............................................... B29C 1/00
[52] U.S. Cl. .................................. 425/192 R; 425/461
[58] Field of Search ........... 425/182, 183, 190, 192 R, 425/311, 464, 461; 266/184

[56] References Cited

U.S. PATENT DOCUMENTS 3,271,822  9/1966  Rhino ................................. 425/461
3,883,109  5/1975  Hahne ............................. 425/183 X
4,050,865  9/1977  Drostholm et al. ................ 425/183
4,384,703  5/1983  Boskovic ........................ 425/190 X Primary Examiner—J. Howard Flint, Jr.
Attorney, Agent, or Firm—Roberts, Spiecens & Cohen

[57] ABSTRACT

A wear-protected workpiece of metal, particularly a perforated granulation plate for plastic extruders, comprising shaped members of wear-resistant material inserted in recesses in the work surface of the workpiece, the spaces between the walls of the recesses and the shaped pieces being filled with a binder. In order to minimize the expenses of manufacture and repair of the wear-protected workpiece and make it possible to use non-metallic wear-resistant material for the insert member, the recesses and the shaped members have walls which widen at least in two opposed regions, the largest dimension of the widened wall of the shaped member being equal to or smaller than the dimension of the opening of the corresponding recess so that the insert member is freely inserted into the recess and forms a space therewith in which a binder can be filled to form a locking means for the insert member in the workpiece.

15 Claims, 3 Drawing Figures

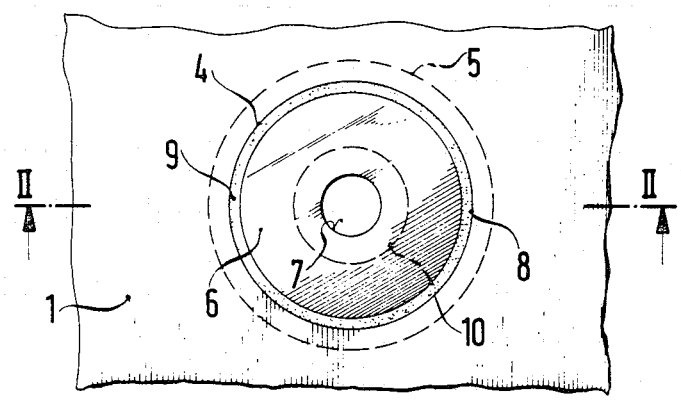
FIG. 1
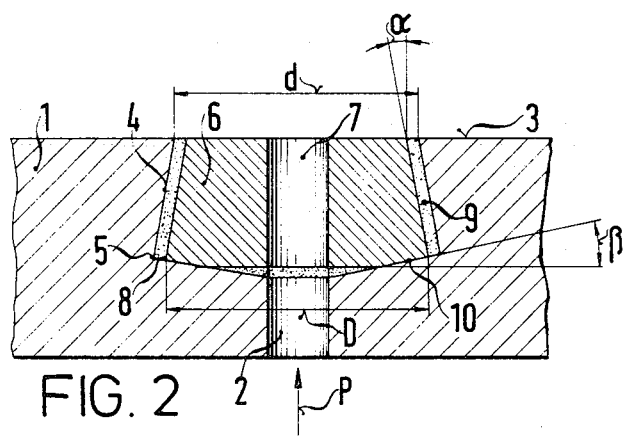
FIG. 2
FIG. 3
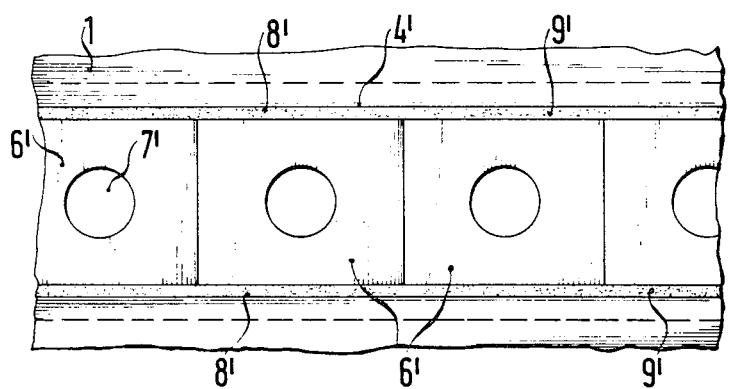

WORKPIECE HAVING WEAR-RESISTANT INSERTS LOCKED IN RECESSES IN THE WORKPIECE

FIELD OF THE INVENTION

The invention relates to a workpiece, particularly a perforated granulation plate for a plastic extruder.

The invention relates more specifically to a workpiece comprising a metal plate having a recess therein in which a shaped insert member is received.

BACKGROUND

The perforated granulation plates used in plastic extruders are subject to intense wear on the work surface on which granulation knives pass and it is customary to cover this surface with wear-resistant material, at least in the region of holes which form the plastic composition into strands. The attachment of the wear-resistant material, which, as a rule, is in the form of a shaped member having one or more holes, is generally effected by soldering, which makes it necessary for the materials of the parts to be connected to consist of metal or contain metallic components. The latter is true, for instance, in the case of sintered tungsten carbide. Due to the high demands which are made on such solder connections, generally only noble metals are used as the solder. Furthermore, the soldering must be effected in a specifically defined atmosphere which as in an inert-gas or vacuum furnace. The removal of the shaped members in the event of repairs requires considerable work and expense as a result of the diffusion bond produced by the soldering.

A perforated granulation plate of the type described above is known from U.S. Pat. No. 3,271,822. For protection against wear, the work surface of the perforated granulation plate is provided with square shaped pieces of sintered tungsten carbide. The shaped members have a hole which is coincident with a bore in the perforated granulation plate for the passage of the plastic mass and the shaped members are inserted into a circular recess in the surface of the perforated plate. The bottom of the recess is covered with thin strips of silver solder and copper. The spaces present between the vertical walls of the shaped members and the walls of the recess are also filled with strips of the solder material. The soldering is effected by heating the entire perforated granulation plate in an inert-gas furnace to the melting point of the solder material. The production of the means for providing wear protection is therefore very involved and expensive in the case of the known perforated granulation plate.

It is known from U.S. Pat. No. 3,804,392 for double-shaft worm extruders having a bore which is of figure-eight shape in cross section, to provide the inner surfaces thereof in part with wear-resistant inserts. These inserts have a trapezoidal cross section and are arranged in dovetail-shaped longitudinal grooves. Since the cross sections of the inserts and of the grooves coincide, the inserts can be pushed into the grooves only from one end.

SUMMARY OF THE INVENTION

An object of the present invention is to provide wear protection for a workpiece in which the expense for the manufacture and repair of the wear protection is reduced particularly for a perforated granulation plate.

A further object of the invention is to provide such wear protection in which it is possible to use non-metallic wear-resistant material.

The above and further objects are achieved in accordance with the invention by the provision of a wear protected metal workpiece comprising a metal plate having a work surface with a recess therein extending from the work surface into the plate and a shaped member of wear-resistant material inserted into said recess and having an outer surface which is substantially flush with the work surface of the plate.

The plate has a wall bounding the recess which, at least at two opposed locations, widens inwardly into the plate in a direction away from said work surface, said shaped member having an outer wall which, at least at two opposed locations, widens in the direction of insertion thereof into said recess.

The walls of the recess and of the shaped member define a space therebetween at said respective opposed locations.

The recess has an opening at the work surface of the plate of an extent to freely receive the shaped member which has a maximum extent at said two locations which is less than the extent of said opening of said recess.

The space formed between the walls of the recess and the shaped member is filled with a binder means for locking the shaped member in the recess.

In accordance with the invention, said space, which is inclined in widening fashion from the work surface and is filled with the binder means secures the shaped insert in the recess less by the adherence of the binder means to the material of the shaped insert, on the one hand, and to the material of the of the workpiece at the recess, on the other hand, than by the binder means which, in solidified form, acts as a locking means. In contradistinction to the exclusively force-locked connection of the insert pieces in the case of the known perforated granulation plates, a predominantly form-locked connection is obtained in the invention. This, in turn, permits a larger selection both of the wear-resistant materials and of the binders.

As a wear-resistant material of the insert members, there may be used not only metals or metal-containing mechanically resistant materials such as, for instance, sintered tungsten carbide, but also ceramic mechanically resistant materials having a base of metal oxides, nitrides, borides, silicides and the like. The possibility of using non-metallic wear-resistant materials is of interest specifically in the case of perforated granulation plates for plastic extruders, since certain plastics exhibit strong adherence to metals, as a result of which the granulating process may be impaired.

As the binder for the filling of the space between the walls of the recess and the shaped member, the known solders can be used, the shear strength of the binder rather than its adherence being controlling for the quality of the attachment. For this reason, filled or unfilled adhesives may also be used as the binder, metal-filled adhesives being preferred for considerations of strength. It is even conceivable to fill the space with molding sand which has been impregnated with phenol resin.

The use of adhesives as the binder, which is made possible by the invention, provides considerable advantages in the repair of perforated granulation plates. By heating the plate to a temperature above the temperature of decomposition of the adhesive, the binder is consumed by burning whereupon the shaped insert members can be readily removed from the recesses. Temperatures of 100° to 500° C. are generally sufficient for the thermal decomposition of adhesives.

BRIEF DESCRIPTION OF THE VIEWS OF THE DRAWING

FIG. 1 is a top plan view of a portion of a perforated granulation plate in accordance with the invention;

FIG. 2 is a section taken along line II—II in FIG. 1; and

FIG. 3 is a top plan view of another embodiment of a perforated granulation plate in accordance with the invention, only a portion of which has been shown.

DETAILED DESCRIPTION OF PREFERRED EMBODIMENTS

In the embodiments shown, a wear-protected metal workpiece is in the form of a perforated granulation plate 1 for plastic extruders. The perforated granulation plate 1 has holes 2 through which plastic passes in the direction indicated by the arrow P to be shaped into strands. Knives (not shown), pass over the work surface 3 of the plate 1 and cut the strands of plastic into granulate.

As seen in FIGS. 1 and 2, an annular recess 4 is provided at the surface 3 of the plate concentrically with the hole 2, the recess 4 having a wall 5 which widens conically in a direction away from the surface 3 of the plate. In the recess 4 is inserted a member 6 of wear-resistant material, also of annular shape and in the center of which is a hole 7 which corresponds to the hole 2. The shaped member 6 also has an inwardly widening conical surface 8. The shaped member 6 is so dimensioned that its largest diameter D is equal to or smaller than the diameter d of the recess 4 in the region where it is open at the surface 3 of the plate. Therefore, the shaped member 6 can be freely inserted into the recess at the surface 3. Upon insertion, the upper surface of the member 6 is substantially flush with the work surface 3 of the plate.

Between the walls of the recess 4 and the shaped member 6 there remains a space 9 which is filled with a binder. The binder, which is preferably an adhesive, is introduced in liquid form into the space 9, where it solidifies or hardens in situ. In hardened condition it then acts as a locking means and prevents the shaped member 6 from being pushed out of the recess 4 by the pressure of the mass of plastic acting in the direction indicated by the arrow P.

As a result of the conical shape of the recess and the shaped member as shown in FIGS. 1 and 2, the space 9 extends around the entire circumference of the recess 4 and the shaped member 6 respectively. If the shaped piece and/or the recess has a polygonal cross-section the locking action in accordance with the invention can be obtained if the inwardly directed recesses are provided at least at two opposite regions with respect to the central axis. Such an embodiment is shown in FIG. 3, in which the recess 4' is in the form of a linear dovetail groove. The shaped member 6' each having hole 7' are square in shape and have two opposite, inwardly directed surfaces 8'. The shaped members are inserted into the recess 4' such that their vertical said walls abut in the longitudinal direction of the recess and the widening surface 8' are opposite the inwardly inclined walls of the recesses 4' to form spaces 9' which are filled with binder. A cross section through the embodiment of FIG. 3 corresponds approximately to FIG. 2. Instead of being linear, as shown, the recess 4' formed as a dovetail groove could also be circular. The shaped mebers 6' would then have a trapezoidal shape.

As can be seen from FIG. 2, the walls of the recess 4 and of the shaped member 6 are inclined inwards relative to the vertical at an angle $\alpha$. This angle of inclination is between 1° and 20° and is preferably 1° to 5°. In order that the shaped member 6 is centered upon its insertion into the recess 4 and its upper surface is flush with the work surface 3 of the plate, both the recesses and the shaped members have, at least in part, an inwardly inclined bottom surface 10. Surface 10 has an angle of inclination $\beta$ relative to the horizontal of 15° to 40° and preferably 15° to 30°.

As seen from the above, the invention provides a wear-protected workpiece in which the insert member is freely inserted into the recess and the binder after hardening serves as a retaining means to lock the insert member into the recess in a determined position in which the surface of the insert member is substantially flush with the work surface of the plate.

The binder can be in the form of an adhesive which is introduced in liquid form in the space between the insert member and the recess and which, when hardened, constitutes the retaining means locking the insert member into the recess.

By virtue of the construction of the invention in which the hardened binder serves as the form retaining means for the insert member, the insert member can be made of any material which will function as a wear-resistant material. Thus, the insert member can be made of metal or ceramic material as long as it provides a wear-resistant function at the work surface of the workpiece.

Although the invention has been described in relation to specific embodiments thereof, it will become apparent to those skilled in the art that numerous modifications and variations can be made within the scope and spirit of the invention if defined by the attached claims.

What is claimed is:

1. A wear-protected metal workpiece comprising a metal plate having a work surface, said plate having a recess therein extending from said work surface into said plate, a shaped member of wear-resistant material inserted into said recess and having an outer surface which is substantially flush with the work surface of the plate, said plate having a wall bounding said recess which at least at two opposed locations widens inwardly into said plate in a direction away from said work surface, said shaped member having an outer wall which at least at two opposed locations widens in the direction of insertion thereof into said recess, the walls of the recess and of the shaped member defining a space therebetween at said respective opposed locations, said recess having an opening at the work surface of said plate of an extent to freely receive the shaped member which has a maximum extent at said two locations which is less than the extent of said opening of said recess, and binder means filling said space for locking said shaped member in said recess.

2. A workpiece as claimed in claim 1 wherein said wall of the plate which bounds said recess widens inwardly into the plate over the entire peripheral extent of said recess, said outer wall of said shaped member also widening over the entire peripheral extent thereof.

3. A workpiece as claimed in claim 2 wherein said walls of the recess and the plate have an angle of widening of between 1° and 20°.

4. A workpiece as claimed in claim 3 wherein said walls of the recess and the plate have an angle of widening of between 1° and 5°.

5. A wear-protected metal workpiece as claimed in claim 1 wherein said walls of the recess and the shaped member are conical.

6. A wear-protected metal workpiece as claimed in claim 1 wherein said recess is of dovetail shape and said shaped member is a four-sided polygon whose outer wall widens at two opposite sides.

7. A wear-protected metal workpiece as claimed in claim 6 wherein the wall of said shaped member at said other two sides of said polygon is perpendicular to the outer surface of the shaped member.

8. A wear-protected metal workpiece as claimed in claim 1 wherein said recess and said shaped member have bottom surfaces which are inclined with respect to said work surface.

9. A wear-protected metal workpiece as claimed in claim 8 wherein the angle of inclination of the bottom surfaces is between 15° and 40°.

10. A wear-protected metal workpiece as claimed in claim 8 wherein the angle of inclination of the bottom surfaces is between 15° and 30°.

11. A wear-protected metal workpiece as claimed in claim 1 wherein said plate and said shaped member have respective holes which are aligned with one another.

12. A wear-protected metal workpiece as claimed in claim 1 wherein said binder means is thermally decomposable at temperatures between 100° and 500°.

13. A wear-protected metal workpiece as claimed in claim 1 wherein said binder means is initially liquid in said space and is solidified in situ therein to form a solid element which opposes removal of said insert member from said recess.

14. A wear-protected metal workpiece as claimed in claim 13 wherein said solid element of said binder means also is bonded to the walls of said recess and said insert member.

15. A wear-protected metal workpiece as claimed in claim 1 wherein said insert member is a ceramic material.

* * * * *